(12) United States Patent
Stienhans

(10) Patent No.: US 8,332,816 B2
(45) Date of Patent: Dec. 11, 2012

(54) SYSTEMS AND METHODS OF MULTIDIMENSIONAL SOFTWARE MANAGEMENT

(75) Inventor: Frank Stienhans, Mannheim (DE)

(73) Assignee: SAP Aktiengesellschaft (DE)

( * ) Notice: Subject to any disclaimer, the term of this patent is extended or adjusted under 35 U.S.C. 154(b) by 2012 days.

(21) Appl. No.: 11/194,476

(22) Filed: Aug. 2, 2005

(65) Prior Publication Data

US 2007/0033201 A1    Feb. 8, 2007

(51) Int. Cl.
*G06F 9/45* (2006.01)
(52) U.S. Cl. ........................................ 717/120
(58) Field of Classification Search .................. 717/120
See application file for complete search history.

(56) References Cited

U.S. PATENT DOCUMENTS

| | | | |
|---|---|---|---|
| 5,655,118 A * | 8/1997 | Heindel et al. | 707/103 R |
| 6,698,018 B1 * | 2/2004 | Zimniewicz et al. | 717/175 |
| 7,191,435 B2 * | 3/2007 | Lau et al. | 717/168 |
| 7,266,819 B2 * | 9/2007 | Helgesen et al. | 717/176 |
| 7,313,531 B2 * | 12/2007 | Chappel et al. | 705/7 |
| 7,380,270 B2 * | 5/2008 | Tracy et al. | 726/3 |
| 7,448,023 B2 * | 11/2008 | Chory et al. | 717/124 |
| 7,672,884 B2 * | 3/2010 | Schuster et al. | 705/35 |
| 7,890,285 B2 * | 2/2011 | Manfredi | 702/120 |
| 2002/0042687 A1 * | 4/2002 | Tracy et al. | 702/119 |
| 2003/0083978 A1 * | 5/2003 | Brouwer | 705/37 |
| 2003/0163783 A1 * | 8/2003 | Chikirivao et al. | 715/513 |
| 2004/0133875 A1 * | 7/2004 | Kramer | 717/101 |
| 2004/0168152 A1 * | 8/2004 | Kramer | 717/120 |
| 2005/0015752 A1 * | 1/2005 | Alpern et al. | 717/131 |
| 2005/0071185 A1 * | 3/2005 | Thompson | 705/1 |
| 2005/0071820 A1 * | 3/2005 | Srinivas et al. | 717/129 |
| 2005/0160411 A1 * | 7/2005 | Sangal et al. | 717/144 |
| 2006/0010425 A1 * | 1/2006 | Willadsen et al. | 717/120 |
| 2006/0195819 A1 * | 8/2006 | Chory et al. | 717/117 |
| 2006/0247878 A1 * | 11/2006 | Manfredi | 702/108 |
| 2007/0016544 A1 * | 1/2007 | Graefe et al. | 707/1 |

* cited by examiner

*Primary Examiner* — John Chavis
(74) *Attorney, Agent, or Firm* — Finnegan, Henderson, Farabow, Garrett & Dunner LLP

(57) ABSTRACT

Methods, systems, and articles of manufacture consistent with embodiments of the present invention may receive information associated with a dependency between an element of a first dimension of software management and an element of a second dimension of software management, and may analyze a modification to software according to the received information.

14 Claims, 5 Drawing Sheets

SYSTEMS AND METHODS OF MULTIDIMENSIONAL SOFTWARE MANAGEMENT

BACKGROUND

1. Technical Field

Embodiments consistent with the present invention generally relate to systems and methods for managing software.

2. Related Art

Software management becomes more complex as software becomes more complex. This is because the amount of information required by software managers to make good software management decisions increases greatly as software complexity increases. Often times, not all of the relevant information is available or information may be overlooked. Further, software managers must evaluate and organize the large amount of information to make good decisions. Without assistance, this may be overwhelming and can lead to wasted time and resources.

Accordingly, it would be beneficial to provide a system and method for managing software.

SUMMARY

Consistent with embodiments of the present invention, systems and methods disclosed may manage software or assist in software management.

One exemplary embodiment of the invention relates to a software management method. The method may include receiving information associated with a dependency between an element of a first dimension of software management and an element of a second dimension of software management, and analyzing a modification to software using the received information.

Another exemplary embodiment of the invention relates to another software management method. The method may comprise providing a data store including best practices information reflecting each dimension of a set of dimensions associated with software management operations, analyzing software using the best practices information to identify management practices in managing the software that do not meet the best practices, updating the data store with information on additional best practices determined from the analysis, and generating an alert based on the identification of management practices used in managing the software that do not meet the best practices Another exemplary embodiment of the invention relates to a system. The system may include a component for receiving information associated with a dependency between an element of a first dimension of software management and an element of a second dimension of software management, and a component for analyzing a modification to software using the received information.

Another exemplary embodiment of the invention relates to another system. The system may include a storage device containing best practices information reflecting each dimension of a set of dimensions associated with software management operations. The system may include a processor for analyzing software using the best practices information to identify management practices in managing the software that do not meet the best practices, updating the storage device with information on additional best practices determined from the analysis, and generating an alert based on the identification of management practices used in managing the software that do not meet the best practices.

Another exemplary embodiment of the invention relates to a computer-readable medium containing instructions to configure a processor to execute a software management method.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this specification, illustrate several embodiments of the invention and together with the description, serve to explain principles of the invention. In the drawings.

DETAILED DESCRIPTION

Figure 1:
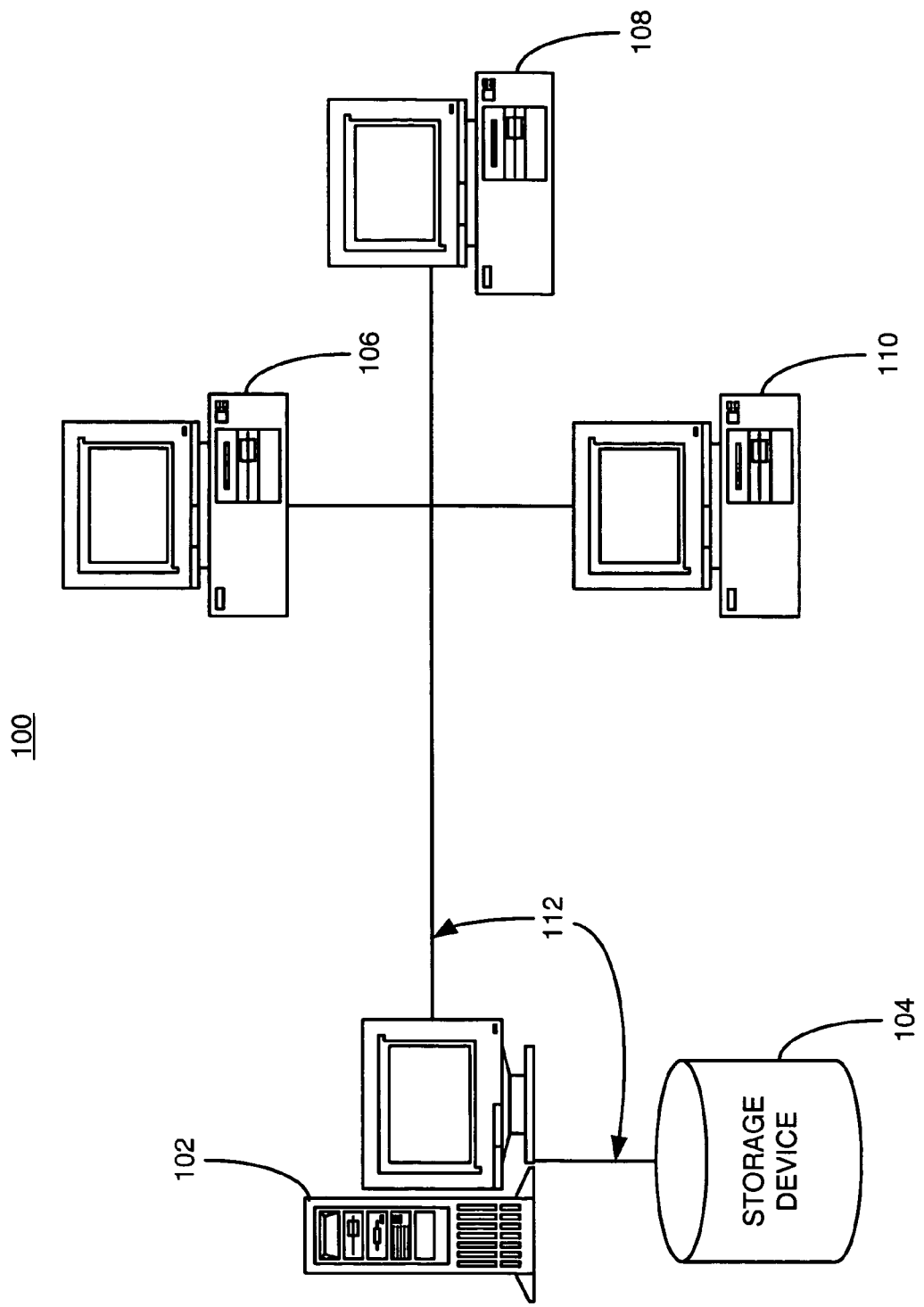
FIG. 1 illustrates an exemplary system consistent with an embodiment of the invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Consistent with one embodiment of the present invention, systems and methods for software management are described. As discussed herein, software management is the administration, configuration, development, or any other handling of software. Software are programs, computer applications, executable code, computer instructions, electronic data, computer data, or any other type of data that can be received or stored. Software management may include configuring software, monitoring software, developing software, modifying software, or running software. Software management may also include managing hardware in association with software. Hardware may include any electronics-related, computer-related, or other types of devices capable of receiving, storing, executing, developing, using, or handling software.

As described below, systems consistent with one embodiment of the invention may receive information associated with a dependency between an element of a first dimension of software management and an element of a second dimension of software management. A dimension of software management is a facet of software management. Each dimension of software management may contain one or more elements related to a facet of software management. A dimension of software management may include any facet relevant to the managing or developing of software. For example, dimensions of software management may include a software management objective dimension, a software management information dimension, a software management activity dimension, a software management time/cost dimension, a software management soft factor dimension, or other software management dimension.

The software management objective dimension is the facet of software management relating to software management objectives. Exemplary elements of the software management objective dimension may include availability, reliability, performance, security, flexibility, or other objective. Availability involves ensuring specific software is accessible for users. Reliability involves ensuring specific software is dependable, so that users can trust the software. Performance involves ensuring specific software fulfills expectations of users in terms of response time and other performance criteria. Security involves protecting systems, software, data, or other information from misuse or unauthorized access. Flexibility involves the ability to quickly adapt to new requirements and demands as needed.

The software management information dimension is the facet of software management relating to receiving or obtaining information to manage software. Exemplary elements of the software management information dimension may include system landscape, hardware/software status, users/roles, integration, responsibilities, or other information. System landscape relates to the scope and types of systems for which software is being managed, the system load (e.g., network load, processor load), how the systems interact, or other system-level information. Hardware/software status relates to the condition of hardware or software, the type of hardware or software used, configuration of hardware or software, software patches installed, amount of available disk space, or other hardware and software information. Users/roles relate to the identities of users that work with managed software, user rights and privileges, user usage behavior, or other user information. Integration relates to user dependence on particular software or functions, level of integration between software components, compatibility of software (e.g., compatibility between components, component versions, patches), or other integration information. Responsibilities relate to the individuals or entities responsible for particular portions of software management in a company or organization.

The software management activity dimension is the facet of software management relating to activities that can be carried out in software management. Exemplary elements of the software management activity dimension may include configuration, tracing, workflow, contact, issue tracking, installation/roll-back, external communication, or other activity. Configuration involves actions to configure software or hardware, such as defining whether a web service is accessed via HTTP or HTTPS, configuring user access to different functionalities, configuring application settings (e.g., background color, application features), or other set up activities. Tracing relates to implementing processes to analyze an issue, such as, for example, determining the reason for a system crash or a performance slow down. Workflow relates to starting certain work flows, such as, for example, ordering additional hardware which might begin the process of obtaining, configuring, testing, and distributing the hardware. Contact relates to implementing processes to build up communication between people, such as, for example, conducting informal meetings between software managers and target users. Issue tracking relates to tracking problems or other kinds of issues, for example, by reporting the issue and monitoring the issue during the issue's lifetime. Installation/roll-back relates to installing and uninstalling software, upgrades, patches, and hardware. External communication relates to communicating or facilitating communication between individuals and/or organizations, such as, for example, interfacing between a information technology (IT) department and other parts of a company through service level agreements, communicating with third party providers in the IT business, communicating with service providers, or communicating with users of the IT landscape.

The software management time/cost dimension is the facet of software management relating to time, cost, and revenue. Exemplary elements of the software management time/cost dimension may include time maximums, time minimums, costs, or revenues. Time maximums relate to the upper time limits for elements of software management dimensions, such as, for example, maximum time that specific software is expected to remain reliable, maximum time specific software is expected to remain secure using the latest anti-virus tools, or maximum time software management information will remain valid. Time minimums relate to the lower time limits for elements of software management dimensions, such as, for example, minimum time expected to fix a security breach, or minimum time to perform a software management activity. Costs relate to expenses associated with elements of software management dimensions, such as, for example, cost of receiving particular software management information or performing particular software management activities. Revenues relate to expected profits associated with elements of software management.

The software management soft factor dimension is the facet of software management relating to marketing and good will. Exemplary elements of the software management soft factor dimension may include image, motivation, or other soft factors. Image involves the perception of elements of software management dimensions, such as a bank's interest in having the image of offering services with high security and reliability. Motivation relates to the inspiration associated with elements of software management dimensions, such as increased motivation among employees with applications that have good performance and high reliability.

Elements of software management dimensions may be associated with each other. For instance, an element of a software management dimension may have a relationship with and impact another element of the same or another software management dimension. Exemplary relationships between elements of various software management dimensions are discussed below.

An element of the software management objective dimension may require information from different elements in the software management information dimension or activities from different elements in the software management activity dimension. For example, improving security may require information from system landscape, hardware/software status, integration, and responsibilities. Improving performance may require installing a new software version, tracing performance of the new software, changing a configuration, and communicating with different people.

An element of the software management information dimension may affect multiple elements of the software management objective dimension or the software management activity dimension. For example, a new user definition may have impacts on performance, security, and availability. A failed hardware status of a business critical server for more than an hour may lead to changing the server configuration, triggering a workflow to order new hardware, tracing the hardware failure, and communicating with users, IT technicians, and business managers about the failure.

An element of the software management activity dimension may affect multiple elements of the software management activity dimension or the software management information dimension. For example, installing a software patch may increase performance, introduce security leaks, increase flexibility, and decrease reliability. Configuring software for access by a new user may change the privileges in user information and the system load in the system landscape information.

A dependency between elements of software management dimensions reflects the relationship between the elements. The dependency may include a mathematical function, algorithm, logical expression, computer-readable code, program statement, or other mechanism specifying the relationship between the elements. The dependency may specify the relationship between the elements in quantifiable or qualitative terms and may indicate how a change in one element impacts another element in quantifiable or qualitative terms.

Systems consistent with one embodiment of the invention may analyze a modification to software using received information associated with a dependency between an element of a first dimension of software management and an element of a second dimension of software management. The analysis may include evaluating an effect of the modification on the element of the first dimension of software management, the element of the second dimension of software management, and/or other elements of software management dimensions. Analyzing the modification to the software may include quantifying, as a function of the dependency, the effect of the modification on elements of software management dimensions. The analysis may include generating, as a function of the dependency, a report on the analysis of the modification and may include generating, as a function of the dependency, best practice information.

Systems consistent with one embodiment of the invention may generate a proposal on the modification to the software according to the analysis and may automatically implement the generated proposal. The proposal may specify a course of action to follow in implementing the modification to the software and may indicate the effects of the modification to various elements of software management dimensions. If the generated proposal is optimal in each software management dimension, then the generated proposal may be the overall optimal proposal. If the generated proposal is not the overall optimal proposal, then systems consistent with one embodiment of the invention may compare different alternative proposals. The alternative proposals may be compared according to preassigned priorities for different software management dimensions and elements of those dimensions. The right balance between the dimensions and elements may be developed in the form of best practices.

A generated proposal may automatically be implemented if it meets best practices. Best practices are software management procedures or methodologies that have been deemed to be optimal or favorable to follow. As described later, best practices information may reflect each dimension of a set of dimensions associated with software management operations. If a generated proposal fails to meet best practices or an implemented proposal later fails to meet best practices, systems consistent with one embodiment of the invention may generate an alert. The alert may indicate to a software manager or other entity that the proposal does not meet best practices. The system may generate the alert in any form, including for example, e-mails, flags, pop-up messages, and warnings.

For example, in one embodiment of the invention, a company might have determined that for their business, one minute of computer downtime (DT) is equivalent to a $1,000 loss. The company may also determine that public knowledge of a security leak (SL) in the company's computers that releases sensitive customer information corresponds to a loss of $100,000 per month. Finally, the company may know that a computer application response time of 4 seconds compared with 2 seconds leads to $10,000 per month in exponentially increasing damage to good will (GW). The company may store this information as dependencies between elements of software management dimensions.

Further, the company may be faced with a problem where the current average response time of a computer application has degraded to 3 seconds because of a limitation in the company's software and increasing number of users. A patch for the user authentication component in the company's software may be available to improve the average response time by 30 percent, but installation of the patch may require one hour of computer downtime. The patch may also have a security leak risk rate (SLRR) of 5 percent because the patch affects the user authentication component in the company's software. A system consistent with one embodiment of the invention may analyze the effects of installing the patch using the information on the dependencies. The system may calculate that the expected cost of applying the patch would be as follows:

|  | One Time Cost | Per Month Cost |
| --- | --- | --- |
| DT Cost | $60,000 | $0 |
| SL Cost | $5,000 | $0 |
| +GW Cost | $0 | −$3,000 |
| Expected Cost | $65,000 | $−3,000 |

The downtime cost (DT Cost) is a one time cost to install the patch and is given by $1,000 per minute of downtime multiplied by 1 hour (i.e., 60 minutes) of downtime. The security leak cost (SL Cost) is a one time cost because if a security leak results from the patch, the patch can be uninstalled within one month. The SL Cost is given by the product of $100,000 per month, 1 month of public knowledge of a security leak, and a security leak risk rate of 5 percent. The good will cost (GW Cost) is a negative monthly cost because it is an improvement to goodwill resulting from an improvement to average application response time. The GW Cost is given by the difference between the damage in goodwill before and after installing the patch. The damage in goodwill before installing the patch is approximately $3,000 per month because the average application response time is 3 seconds. After installing the patch, the damage in goodwill is approximately $0 per month because the average application response time drops to 2 seconds (i.e., roughly a 30% improvement from 3 seconds).

From the analysis, a system consistent with one embodiment of the invention may determine that after installing the patch, the break even point to recoup a one-time cost of $65,000 is approximately 21 months at a −$3,000 per month cost. Consequently, the system may recommend that the patch not be installed. Alternatively, if the system has information indicating the number of users will increase 10 percent per month, which would reduce average application response time by 20 percent per month, the system may provide a graphical simulation of projected benefits and costs over time and recommend that the patch be applied immediately. The system may further recommend activities to address the increasing number of users, such as starting workflows to acquire hardware upgrades.

In one embodiment consistent with the invention, a software management system may include a component for receiving information associated with a dependency between an element of a first dimension of software management and an element of a second dimension of software management. The system may also include a component for analyzing a modification to software using the received information. These components may be implemented in a system such as system 100 of FIG. 1. Any suitable combination of hardware, software, and/or firmware may be used to implement the components. The hardware, software, and/or firmware may include processors, memory, storage devices, computer-readable mediums, external communication devices, internal communication devices, etc. The aforementioned system 100 is exemplary and other systems may include the components, consistent with embodiments of the present invention.

By way of a non-limiting example, FIG. 1 illustrates an exemplary system 100 consistent with one embodiment of the invention. As shown in FIG. 1, system 100 may include a software management device 102, a storage device 104, and stations 106-110. Software management device 102, storage device 104, and stations 106-110 may communicate over a communication channel 112, such as a network, a bus, a wireless link, or any other mechanism or combination of mechanisms (not shown) for conveying information between locations. A network may be a single network or combination of networks, and may include a local area network, a wide area network, an intranet, an extranet, the Internet, a telephone network, a wired network, a wireless network, or any other medium for communicating between locations.

Software management device 102 may allow an operator or other entity to manage stations 106-110. An operator may use software management device 102 to receive information from storage device 104 and provide relevant information to the operator to manage software on stations 106-110. Alternatively or additionally, device 102 or storage device 104 may receive the information via notifications, monitoring, or documentation. Device 102 may provide an overview of software management status to the operator from the received information and may analyze the received information to generate an analysis of software management operations for the operator. Software management operations may include any actions or procedures related to management of software, including for example, modifications to software on stations 106-110. Software management device 102 may be a computer, a server, a mainframe, or any other mechanism used to manage and configure software on stations 106-110.

Storage device 104 may contain a data store of best practices information. Storage device 104 may include magnetic storage devices such as floppy disks and hard drives, optical storage devices, such as compact discs and digital video discs, memory, or any other medium for storing information.

Figure 2:
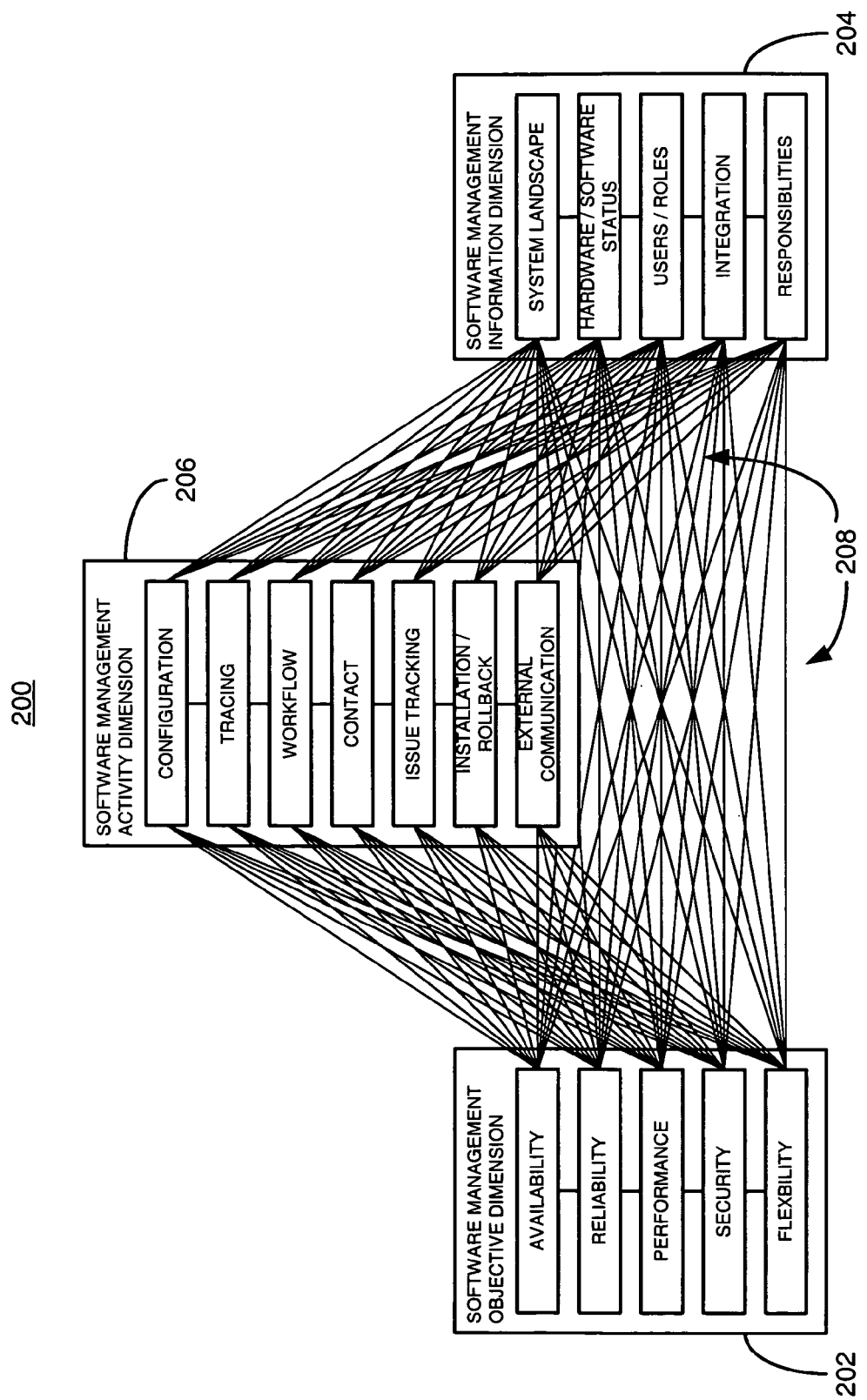
FIG. 2 illustrates exemplary data records consistent with an embodiment of the invention.

Further, storage device 104 may store information relating to elements of software management dimensions and relationships between various elements of software management dimensions. For example, storage device 104 may contain exemplary data records 200 illustrated in FIG. 2. Data records 200 may include information on software management dimensions, such as for example, records 202-206. Each of records 202-206 may contain information on elements of the software management dimensions and information specifying the relationships and dependencies 208 between the elements. As shown in FIG. 2, dependencies 208 between elements are illustrated by lines connecting the elements. Storage device 104 may store information on dependencies 208 between every element or may store information on dependencies 208 between some, but not every element.

Stations 106-110 may contain software under control or management by software management device 102. Hardware in stations 106-110 or associated with stations 106-110 may also be under control or management of device 102. An operator may modify software on stations 106-100 by using software management device 102 to send commands and data (e.g., patches, software updates, etc.) and receiving information updates over communication channel 112. Stations 106-110 may include computer stations, personal digital assistants, printers, computer peripherals, electronic devices, telephones, or any other devices containing software.

Figure 3:
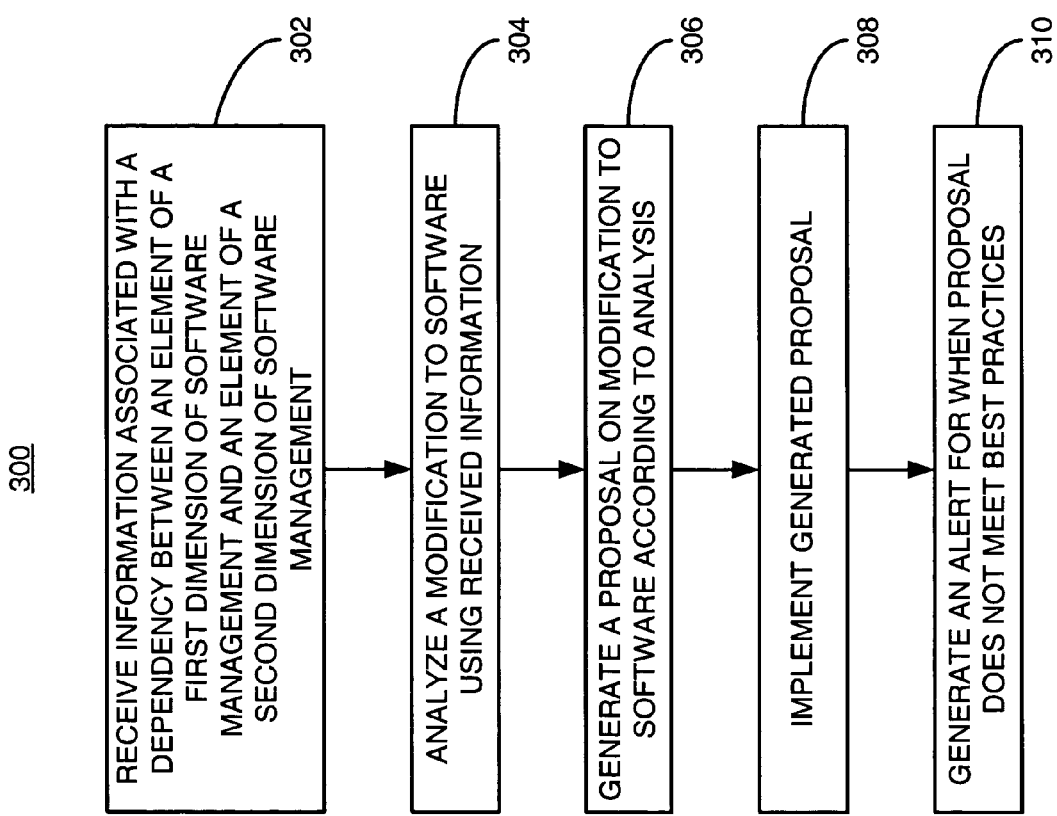
FIG. 3 illustrates an exemplary method consistent with an embodiment of the invention.

FIG. 3 illustrates an exemplary method 300 consistent with one embodiment of the present invention for managing software. In one embodiment, system 100 may implement method 300, in part or in its entirety. By way of illustration, system management device 102 or storage device 104 may receive information associated with a dependency between an element of a first dimension of software management and an element of a second dimension of software management (stage 302). The received information may include information on multiple dependencies between multiple elements, such as all dependencies or a subset of all dependencies between multiple elements. System management device 102 may analyze a modification to software using the received information (stage 304).

System management device 102 may generate a proposal on the modification to the software according to the analysis (stage 306) and may implement the generated proposal (stage 308). System management device 102 may automatically implement the generated proposal by modifying software on any or all of stations 106-110. The degree of automation may vary and a user may or may not be involved in automatically implementing the generated proposal. System management device 102 may determine if the generated proposal meets best practices. If the generated proposal does not meet best practices, system management device 102 may generate an alert (stage 310). The alert may be generated before, during, or after implementing the generated proposal.

Figure 4:
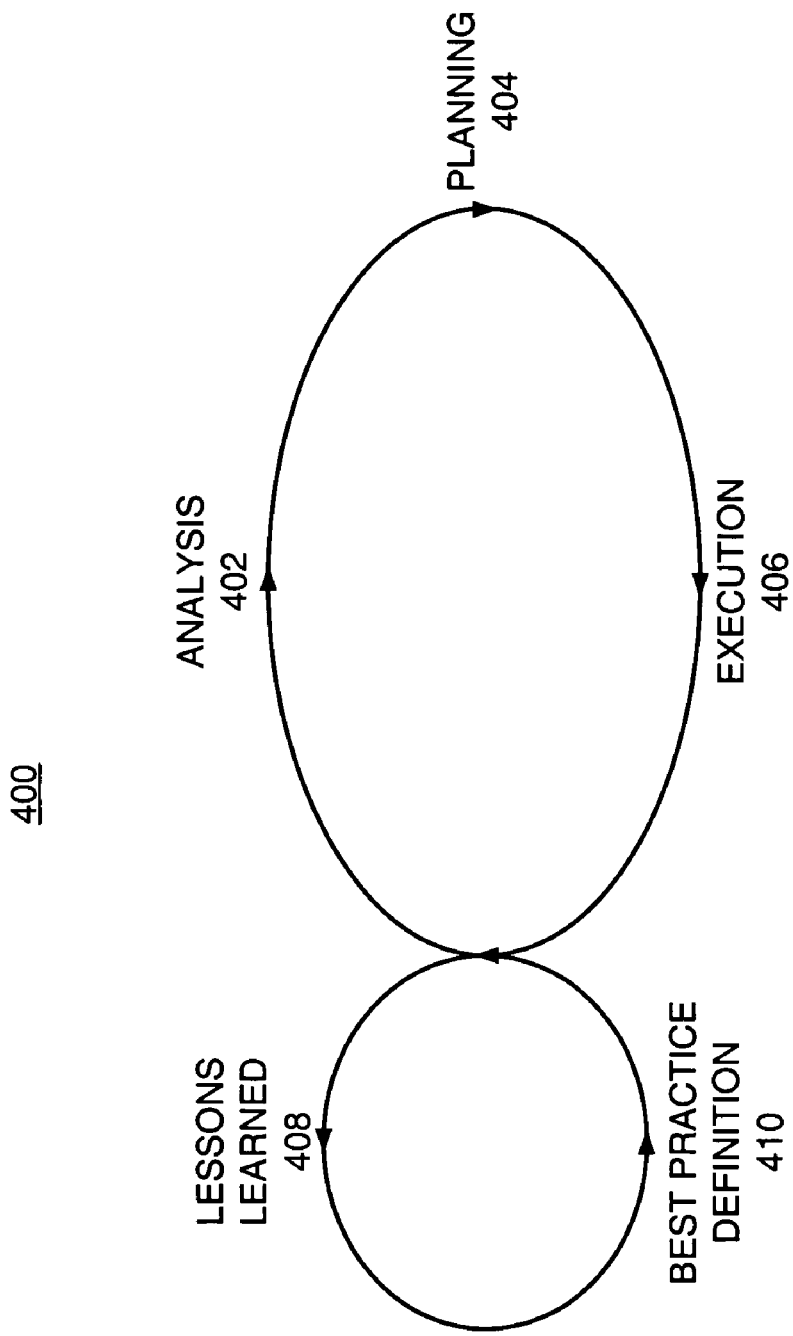
FIG. 4 illustrates an exemplary software management life cycle consistent with an embodiment of the invention.

Systems and methods consistent with one embodiment of the invention may develop best practices for software management. A software management life cycle may be used to develop the best practices. FIG. 4 illustrates an exemplary software management life cycle 400, consistent with one embodiment of the invention. Life cycle 400 may include several phases: analysis 402, planning 404, execution 406, lessons learned 408, and best practice definition 410. Analysis 402 relates to reviewing requirements and objectives for software management and determining whether these requirements and objectives can be fulfilled. Planning 404 relates to planning how requirements and objectives can be met and determining in which steps they can be met. Execution 406 relates to implementing a plan to fulfill the requirements and objectives. Lessons learned 408 relates to reviewing what happened during analysis 402, planning 404, and execution 406 phases to see what can be learned. Best practices definition 410 relates to generalizing any lessons learned and combining the lessons learned with any previous lessons learned to form best practices. Best practices provide a starting point for automating analysis 402, planning 404, and execution 406 for specific software management operations.

Lessons learned 408 and best practices definition 410 phases may be optional, once best practices have developed.

Life cycles in software management may depend on requirements and objectives. For instance, specific software management operations to optimize performance of an application may have a very different life cycle than software management operations to introduce a new application. Hence, life cycles generally need to be flexible and adaptable, and life cycle 400 is only one example of a life cycle for certain software management operations. Further, the definition and creation of a life cycle may in itself also be part of a best practice.

Software management methods consistent with one embodiment of the invention may be introduced according to the following life cycle: atomic support, management portal, quantification, and automation. Atomic support may include providing support for tracing, logging, monitoring, and other elementary software management services (e.g., implementing a patch). Software management in the atomic support phase may be unconsolidated and non-automated. In the management portal phase, one may begin to consolidate software management by bringing software management dimensions together in one place in an integrated fashion. By this time, dependencies between elements of the software management information dimension and the software management activity dimension may be known, and best practices may be formed in the context of software management dimensions.

The quantification phase may include quantifying the impacts of dependencies by deriving a value system from best practices to allow quantification of software management elements. For example, a software management activity to change HTTP to HTTPS for a service may allow one to quantify the consequence of the activity on portions of security (e.g., firewalls), performance (e.g., response time), and system landscape (e.g., system load).

The automation phase may include generating proposals according to quantified dependencies. If generated proposals are approved in most cases, then generated proposals may automatically be implemented and exception handling may be employed for cases where a generated proposal is wrong or suboptimal. For example, if a proposal on how to implement a patch was automatically executed, but the executed proposal created errors or turned out to be a bad approach to implement the patch, then an alert may be generated.

Figure 5:
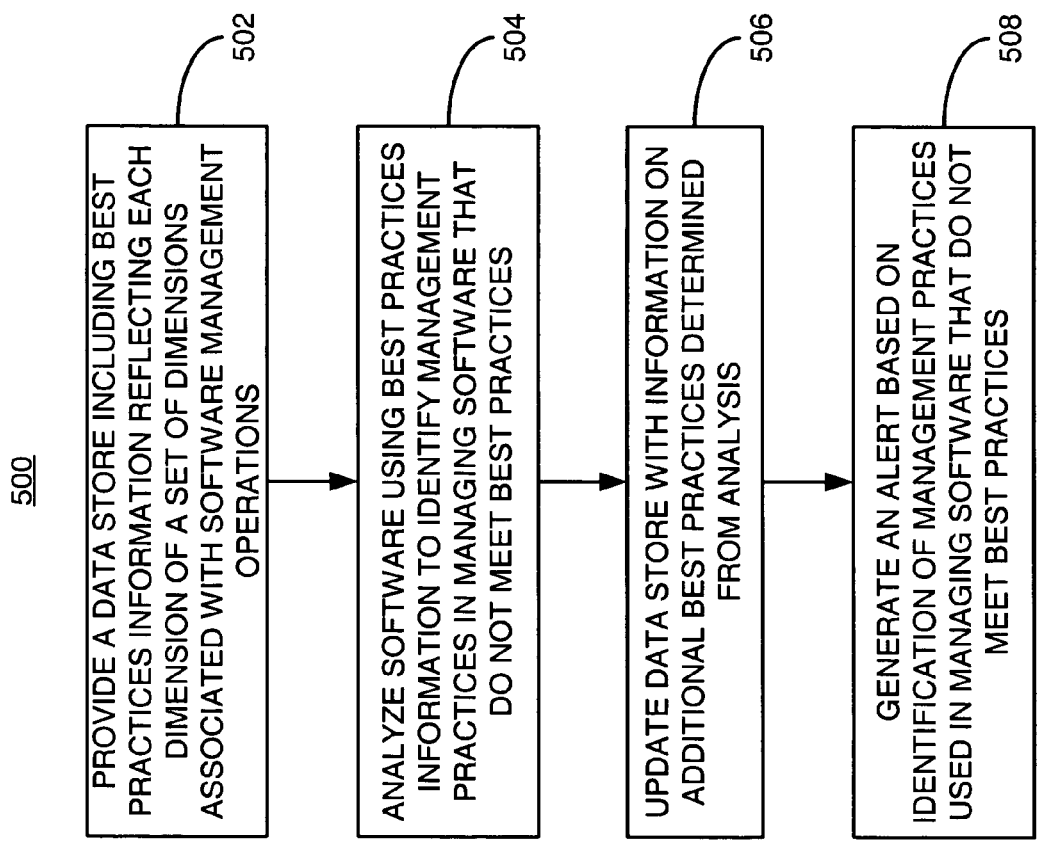
FIG. 5 illustrates another exemplary method consistent with an embodiment of the invention.

FIG. 5 illustrates an exemplary method 500 consistent with one embodiment of the present invention for managing software. In one embodiment, system 100 (in FIG. 1) may implement method 500, in part or in its entirety. By way of illustration, software management device 102 or storage device 104 may provide a data store including best practices information reflecting each dimension of a set of dimensions associated with software management operations (stage 502). Software management device 102 may analyze software using the best practices information to identify management practices in managing the software that do not meet the best practices (stage 504). Software management device 102 may update the data store with information on additional best practices determined from the analysis (stage 506) and may generate an alert based on the identification of management practices used in managing the software that do not meet the best practices (stage 508).

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer implemented software management method for determining whether a modification to software is compliant with best practices, the method comprising:
receiving information associated with a dependency between an element of a first dimension of software management and an element of a second dimension of software management, the dependency specifying a relationship, in quantifiable terms, between the element of the first dimension and the element of the second dimension;
quantifying an effect of the modification on the element of the first dimension;
quantifying, as a function of the dependency, an effect of the modification on the element of the second dimension;
generating a proposal on the modification based on the quantified effect on the element of the first dimension and the quantified effect of the modification on the element of the second dimension; and
automatically implementing the proposal when the proposal meets the best practices.

2. The method of claim 1, wherein the element of the first dimension is one of a plurality of elements associated with the first dimension, and the element of the second dimension is one of a plurality of elements associated with the second dimension.

3. The method of claim 1, wherein receiving information comprises receiving information associated with a plurality of dependencies between elements of a plurality of software management dimensions.

4. The method of claim 3, wherein the plurality of software management dimensions comprises a software management objective dimension, a software management information dimension, and a software management activity dimension.

5. The method of claim 1, further comprising generating, as a function of the dependency, a report associated with the modification to the software.

6. The method of claim 1, further comprising:
generating an alert when the proposal does not meet the best practices.

7. A computer implemented software management method executed by a processor, the method comprising:
storing best practices reflecting a set of dimensions associated with software management operations;
analyzing software using the best practices to identify management practices in managing the software that do not meet the best practices, wherein analyzing software comprises:
analyzing a dependency specifying a relationship, in quantifiable terms, between (i) an element of a first dimension of the set of dimensions associated with the software management operations and (ii) an element of a second dimension of the set of dimensions associated with the software management operations, and storing a quantification of the elements based on the best practices;

updating the best practices based on the analysis; and generating an alert based on the identification of management practices used in managing the software which do not meet the best practices.

8. The method of claim 7, wherein updating the best practices comprises updating the dependency according to the analysis.

9. The method of claim 7, further comprising automatically implementing the management practices.

10. The method of claim 7, wherein the set of dimensions comprises a software management objective dimension, a software management information dimension, and a software management activity dimension.

11. A system for determining whether a modification to software is compliant with best practices comprising:
 a processor for executing one or more components;
 a component for receiving information associated with a dependency between an element of a first dimension of software management and an element of a second dimension of software management, the dependency specifying a relationship, in quantifiable terms, between the element of the first dimension and the element of the second dimension;
 a component for quantifying an effect of the modification on the element of the first dimension;
 a component for quantifying, as a function of the dependency, an effect of the modification on the element of the second dimension;
 a component for generating a proposal on the modification based on the quantified effect on the element of the first dimension and the quantified effect of the modification on the element of the second dimension; and
 a component for automatically implementing the proposal when the proposal meets the best practices.

12. A system comprising:
 a storage device storing best practices reflecting a set of dimensions associated with software management operations; and
 a processor configured to:
  analyze software using the best practices to identify management practices in managing the software that do not meet the best practices, wherein analyzing software comprises:
   analyzing a dependency specifying a relationship, in quantifiable terms, between (i) an element of a first dimension of the set of dimensions associated with the software management operations and (ii) an element of a second dimension of the set of dimensions associated with the software management operations, and
   storing a quantification of the elements based on the best practices;
  update the best practices based on the analysis; and
  generate an alert based on the identification of management practices used in managing the software which do not meet the best practices.

13. A computer-readable storage medium for configuring a processor to execute a method for determining whether a modification to software is compliant with best practices, the method comprising:
 receiving information associated with a dependency between an element of a first dimension of software management and an element of a second dimension of software management, the dependency specifying a relationship between the element of the first dimension and the element of the second dimension in quantifiable terms;
 quantifying an effect of the modification on the element of the first dimension;
 quantifying, as a function of the dependency, an effect of the modification on the element of the second dimension;
 generating a proposal on the modification based on the quantified effect on the element of the first dimension and the quantified effect of the modification on the element of the second dimension; and
 automatically implementing the proposal when the proposal meets the best practices.

14. A computer-readable storage medium for configuring a processor to execute a method comprising:
 storing best practices reflecting a set of dimensions associated with software management operations;
 analyzing software using the best practices to identify management practices in managing the software that do not meet the best practices, wherein analyzing software comprises:
  analyzing a dependency specifying a relationship, in quantifiable terms, between (i) an element of a first dimension of the set of dimensions associated with the software management operations and (ii) an element of a second dimension of the set of dimensions associated with the software management operations, and
  storing a quantification of the elements based on the best practices;
 updating the best practices based on the analysis; and
 generating an alert based on the identification of management practices used in managing the software which do not meet the best practices.

* * * * *